(12) United States Patent
Henzler et al.

(10) Patent No.: US 8,074,523 B2
(45) Date of Patent: Dec. 13, 2011

(54) AIR PRESSURE SENSOR WITH MEANS FOR HOOK FASTENING

(75) Inventors: Stephan Henzler, Gomaringen (DE); Tobby Brandt, Boeblingen (DE); Christian Ohl, Pfullingen (DE); Boris Adam, Gaeufelden (DE); Martin Schuerer, Aichtal (DE)

(73) Assignee: Robert Bosch GmbH, Stuttgart (DE)

( * ) Notice: Subject to any disclaimer, the term of this patent is extended or adjusted under 35 U.S.C. 154(b) by 263 days.

(21) Appl. No.: 12/305,599

(22) PCT Filed: Jan. 9, 2008

(86) PCT No.: PCT/EP2008/050195
§ 371 (c)(1),
(2), (4) Date: May 1, 2009

(87) PCT Pub. No.: WO2008/104414
PCT Pub. Date: Sep. 4, 2008

(65) Prior Publication Data
US 2009/0293629 A1 Dec. 3, 2009

(30) Foreign Application Priority Data
Feb. 28, 2007 (DE) .......................... 10 2007 009 697

(51) Int. Cl.
*G01L 7/00* (2006.01)

(52) U.S. Cl. ......................................................... 73/756
(58) Field of Classification Search ..................... None
See application file for complete search history.

(56) References Cited

U.S. PATENT DOCUMENTS

| 5,748,075 | A  | * | 5/1998  | Dirmeyer et al. | ............. 340/436 |
| 7,331,238 | B2 | * | 2/2008  | Wanami et al.   | ................. 73/714 |
| 7,380,437 | B2 | * | 6/2008  | Wanami et al.   | .............. 73/12.09 |
| 7,380,458 | B1 | * | 6/2008  | Date et al.     | ........................ 73/700 |
| 7,398,670 | B2 | * | 7/2008  | Takehara et al. | ............. 73/12.09 |
| 7,406,875 | B2 | * | 8/2008  | Wanami et al.   | ................. 73/715 |
| 7,454,976 | B2 | * | 11/2008 | Wanami et al.   | ................. 73/730 |
| 7,568,393 | B2 | * | 8/2009  | Adam et al.     | .................... 73/715 |

FOREIGN PATENT DOCUMENTS

| DE | 19737821 | 3/1998 |
| EP | 1114757  | 7/2001 |

* cited by examiner

*Primary Examiner* — Harshad Patel
*Assistant Examiner* — Jermaine Jenkins
(74) *Attorney, Agent, or Firm* — Kenyon & Kenyon LLP

(57) ABSTRACT

An air pressure sensor for sensing a side impact includes fastening means for fastening the air pressure sensor on a vehicle wall, the fastening means having a single aperture for accommodating a single fastening element, the fastening element being used for fastening the air pressure sensor on the vehicle wall. Furthermore, the fastening means have a structure on the pressure inlet channel which passes through an aperture in the vehicle door. The at least one structure is shaped in such a way that the at least one structure makes it possible for the air pressure sensor to be hooked on the vehicle wall.

7 Claims, 2 Drawing Sheets

US 8,074,523 B2

AIR PRESSURE SENSOR WITH MEANS FOR HOOK FASTENING

FIELD OF INVENTION

The present invention relates to an air pressure sensor.

BACKGROUND INFORMATION

A sensor assembly is described in German Patent Application No. DE 199 23 985 A1 in which the housing of an air pressure sensor, which is used for sensing a side impact, is attached to a wall in the vehicle using fastening means, e.g., screws. German Patent Application No. DE 191 06 311 A1 also teaches that an air pressure sensor is installed in the wall at a partition panel between the wet space and the dry space in the door. A pressure channel protrudes into the wet space while the air pressure sensor itself is situated in the dry space. A sealing cushion is provided which seals the housing interior against the pressure sensor and also the housing against the partition panel.

SUMMARY OF THE INVENTION

The air pressure sensor according to the present invention for sensing a side impact has an advantage over the related art in that now only a single fastening element is necessary to fasten the air pressure sensor on the vehicle wall. The second fastening point is implemented in a simple manner by the structure on the pressure inlet channel. The air pressure sensor according to the present invention makes a one-handed installation possible, since the air pressure sensor is initially hooked on with the aid of the at least one structure and may then be fastened using the fastening element by pressing against the vehicle wall. This installation is considerably easier compared with the related art. In particular, the air pressure sensor makes considerable cost savings possible since the second fastening element is omitted.

The air pressure sensor is typically provided with a micromechanical element, i.e., a diaphragm structure which makes it possible to measure an air pressure reliably. The air pressure sensor itself has a measured data processing unit and possibly also a transmitting module which makes it possible to transmit the air pressure sensor data to a control unit for triggering passenger protection means. An electronic element may also be provided in the air pressure sensor which enables the air pressure sensor signal to be reconfigured in a simple manner, e.g., with respect to a normal pressure. Such an air pressure sensor has proven to be a reliable and fast sensor for sensing a side impact. The pressure rise in the wet space is measured by the deformation of the vehicle side frame.

The hole, i.e., the aperture, which is used for fastening the fastening element, may typically be a circular borehole in the air pressure sensor. However, other apertures which have elliptical or angular shapes are also possible.

The fastening element has the function of ultimately fastening the air pressure sensor, namely in such a way that the air pressure sensor does not come loose as a result of normal loads.

The vehicle wall is typically a sheet metal door panel which separates the wet space from the dry space in the vehicle side frame.

The structure is shaped in such a way that it is possible to hook the air pressure sensor on the vehicle wall as a first work step in fastening the air pressure sensor. In the second work step, the air pressure sensor is then pressed against the vehicle wall, possibly brought into the final position by maintaining the press-on pressure and then fastened using the fastening element. The structure is situated on the pressure inlet channel, i.e., sort of a lug, which protrudes into the wet space and is supposed to convey the air pressure fluctuations to the pressure measuring element. The aperture in the vehicle wall may be circular or it may also have any other shape.

It is particularly advantageous that the fastening element is designed as a screw, a rivet, a clip, or a screw anchor. Screws and rivets are very reliable fastening elements, while clips are also reliable, but also enable easy handling. A screw anchor is also a very reliable element which may easily be installed.

The at least one structure is advantageously implemented by the pressure inlet channel using an angled bend. This angled bend may be at 90 degrees; it may, however, have any other suitable angle, preferably between 90 and 0 degrees.

For implementing the at least one structure, the pressure inlet channel may also have at least one projection. This projection may then have the shape of a lug or a pin or multiple pins or a screen making it possible that the air pressure sensor according to the present invention is able to be hooked on.

The fastening element is preferably situated on one side of the air pressure sensor and the structure on the opposite side. This optimizes the force distribution. In the installed state, the structure in particular is situated on the upper part of the air pressure sensor and on the lower part of the fastening element.

The fastening element is advantageously shaped in such a way that it allows an electrical contact of the air pressure sensor only when the air pressure sensor is completely installed, i.e., when the fastening element has reached its fastening position. For example, the head of the fastening element may prevent a contact of the air pressure sensor until the installation of the fastening element is completed.

The apertures which are provided in the vehicle wall must be sealed. This is carried in this case on the side of the dry space. For this purpose, a seal is used which is acted upon by the force absorbed by the structure. This seal is preferably situated above the aperture in the wall in the fastened state in order not to be additionally affected by water or other fluids. This increases the reliability of the fastening according to the present invention.

DETAILED DESCRIPTION

Figure 1:
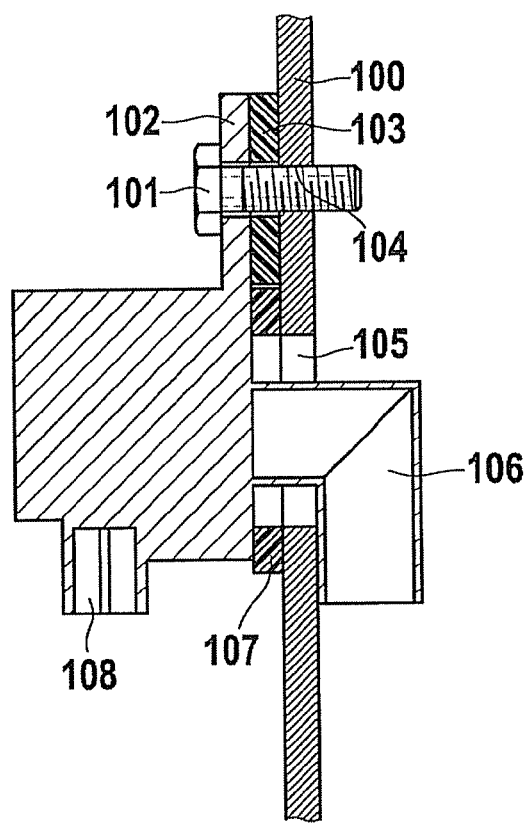
FIG. 1 shows a first side view of an exemplary air pressure sensor according to the present invention.

FIG. 1 depicts the air pressure sensor according to the present invention in a first side view. The vehicle wall is illustrated here in a filled-in form and labeled with reference numeral 100. A screw 101 is provided here in a borehole of the air pressure sensor as the fastening element which passes through an aperture 104 in wall 100. Screw 101 holds air pressure sensor 102 and seal 103 on wall 100. For the sake of simplicity, a necessary nut is not shown here. Pressure inlet channel 106 passes through a large aperture 105 in vehicle wall 100 and is bent at a 90-degree angle, and the angled bend is long enough that pressure sensor 102 may be hooked on wall 100. In a second work step, screw 101 may then be fastened in the wall. Aperture 105 must also be sealed using an additional seal 107.

A plug 108 is provided for accommodating an electrical connection. The pressure inlet channel has its aperture directed downward so that no water or at least only small quantities accumulate in the pressure inlet channel.

It is alternatively possible that screw 101 passes through an aperture below the pressure inlet channel, thereby establishing the fastening. However, in order to optimize this, the at least one structure is not the pressure inlet channel but a projection which enables a hook-on above aperture 105.

Figure 2:
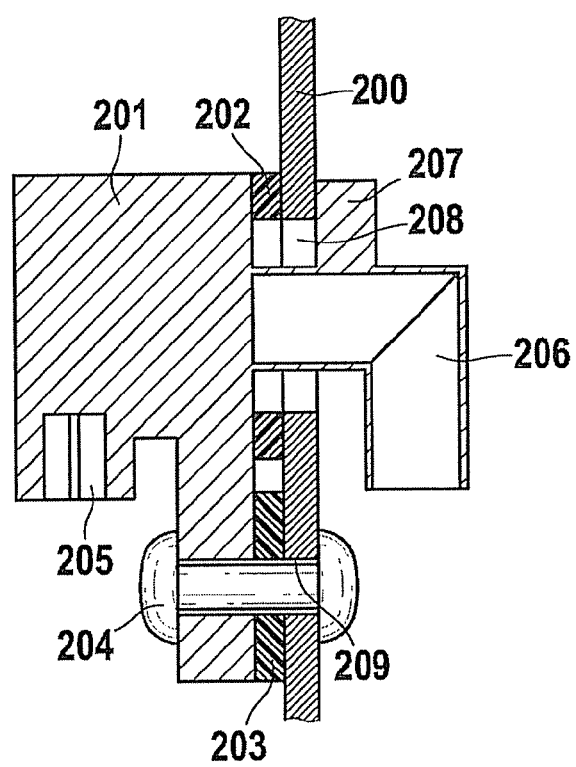
FIG. 2 shows a second side view of the exemplary air pressure sensor according to the present invention.

This is shown in FIG. 2. Pressure inlet channel 206 passes through an aperture 208 in wall 200 which also has a projection 207 here which enables a hook-on on wall 200. Air pressure sensor 201 has a rivet 204 through a borehole which has passed through aperture 209. Rivet 204 is the fastening element in this case. Aperture 209 is sealed by seal 203 and aperture 208 is additionally sealed by seal 202. Electrical plug 205 is allowed to contact rivet 204 only when rivet 204 has reached its installed position, i.e., its final position.

Projection 207 may be shaped in different ways.

Figure 3:
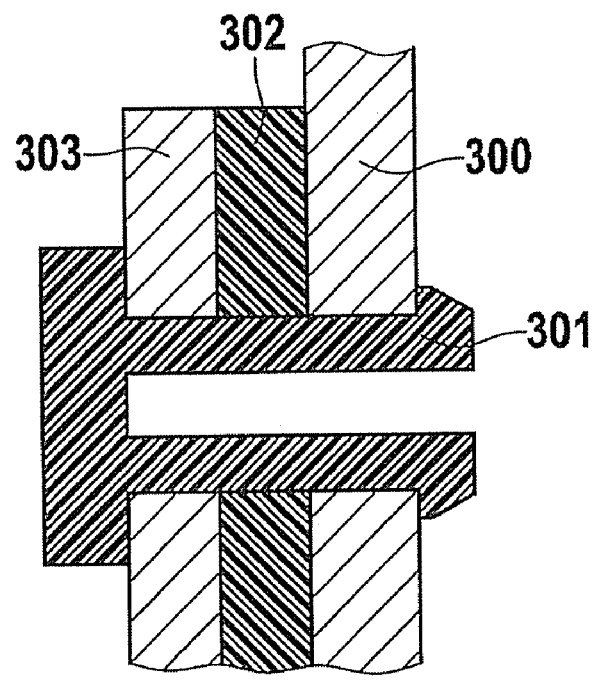
FIG. 3 shows a clip as a fastening element.

FIG. 3 shows an alternative to the screw and the rivet. A detail of air pressure sensor 303 is shown here. A seal 302 is situated between air pressure sensor 303 and wall 300. A clip 301 is provided here as the fastening element enabling easy installation on wall 300. As mentioned above, a screw anchor or another similar fastening element may also be used.

Figure 4:
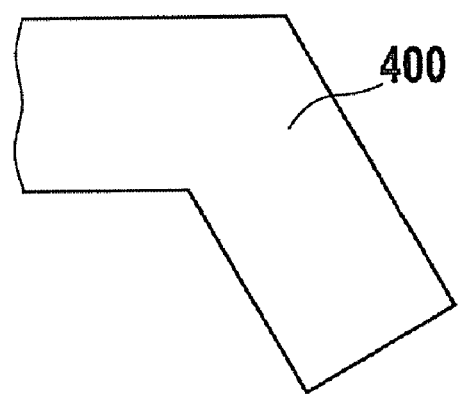
FIG. 4 shows an alternative to the 90-degree angled bend of the pressure inlet channel.

FIG. 4 shows an alternative to the 90-degree angled bend of the pressure inlet channel. In this embodiment, pressure inlet channel 400 is bent at a different angle, here 60 degrees. The angle and the length of the bent part must be such that the air pressure sensor may possibly be hooked through the aperture in the vehicle wall when the pressure inlet channel forms the structure according to the present invention.

What is claimed is:

1. An air pressure sensor for sensing a side impact comprising:
   means for fastening the air pressure sensor on a vehicle wall, wherein the means for fastening include:
   a single aperture for accommodating a single fastening element, the fastening element being used for fastening the air pressure sensor on the vehicle wall, and
   at least one structure on a pressure inlet channel which passes through an aperture in the vehicle wall, the at least one structure being shaped in such a way that the at least one structure and the pressure inlet channel can be inserted through the aperture in the vehicle wall, so that the at least one structure grips a side of the vehicle wall that faces away from the air pressure sensor to hook the air pressure sensor onto the vehicle wall.

2. The air pressure sensor according to claim 1, wherein the fastening element is one of a screw, a rivet, a clip, or a screw anchor.

3. The air pressure sensor according to claim 1, wherein the at least one structure is formed by at least one angled bend along the pressure inlet channel.

4. The air pressure sensor according to claim 1, wherein the at least one structure is at least one projection provided on the pressure inlet channel.

5. The air pressure sensor according to claim 1, wherein the fastening element and the at least one structure are provided on opposite sides of the air pressure sensor in a vertical direction in a fastened state of the air pressure sensor.

6. The air pressure sensor according to claim 1, wherein the fastening element is shaped in such a way that the fastening element prevents an electrical plug of the air pressure sensor from being accessed until the air pressure sensor is fully fastened to the vehicle wall.

7. The air pressure sensor according to claim 1, further comprising:
   a seal located between a body of the air pressure sensor and the at least one structure, such that the seal is acted upon by the at least one structure, and situated above the aperture in the wall, when the air pressure sensor is fastened to the wall.

* * * * *